US006729869B2

(12) United States Patent
Lofink

(10) Patent No.: US 6,729,869 B2
(45) Date of Patent: May 4, 2004

(54) DEVICE FOR APPLYING AN EMBOSSING TO A WEB OF TISSUE PAPER

(75) Inventor: Bernd Lofink, Dirmstein (DE)

(73) Assignee: SCA Hygiene Products GmbH, Mannheim (DE)

( * ) Notice: Subject to any disclaimer, the term of this patent is extended or adjusted under 35 U.S.C. 154(b) by 98 days.

(21) Appl. No.: 10/195,386

(22) Filed: Jul. 16, 2002

(65) Prior Publication Data

US 2003/0010228 A1 Jan. 16, 2003

Related U.S. Application Data

(60) Provisional application No. 60/305,132, filed on Jul. 16, 2001.

(51) Int. Cl.[7] .......................... B29C 59/04; B31F 1/07

(52) U.S. Cl. ......................... 425/363; 101/23; 162/362; 425/385

(58) Field of Search ................................ 425/363, 385; 101/23; 162/362

(56) References Cited

U.S. PATENT DOCUMENTS 3,893,795 A * 7/1975 Nauta ........................ 425/363
4,211,743 A * 7/1980 Nauta et al. ................ 425/363
4,320,162 A 3/1982 Schulz
4,361,085 A 11/1982 Schutz
5,269,983 A 12/1993 Schulz
5,383,778 A * 1/1995 Schulz ....................... 425/363
5,415,918 A 5/1995 Lang et al.
6,106,928 A 8/2000 Laurent et al.

FOREIGN PATENT DOCUMENTS

| | | |
|---|---|---|
| EP | 0 498 623 | 8/1992 |
| EP | 1 033 240 A1 | 9/2000 |
| JP | 06-143466 | 5/1994 |

* cited by examiner

*Primary Examiner*—James P. Mackey
(74) *Attorney, Agent, or Firm*—Young & Thompson

(57) ABSTRACT

An embossing device for embossing a single-ply or multi-ply web of tissue paper includes a first steel roll with embossing protuberances on its peripheral surface and a second roll with a yielding layer on its peripheral surface. The second roll cooperates with the steel roll so as to form an embossing nip therewith. The steel roll and the second roll run in synchronization. The second roll has individual zones on its peripheral surface with a higher overall thickness and/or different material characteristics of the yielding layer compared to that of the remaining peripheral surface. These individual zones are opposed in the embossing nip to embossing protuberances of the steel roll.

13 Claims, 1 Drawing Sheet

DEVICE FOR APPLYING AN EMBOSSING TO A WEB OF TISSUE PAPER

CROSS-REFERENCE TO RELATED APPLICATIONS

The present application claims the benefit of U.S. Provisional Application Ser. No. 60/305,132, which was filed on Jul. 16, 2001. The entire contents of the provisional application are incorporated herein by reference.

BACKGROUND OF THE INVENTION

1. Field of the Invention

The present invention relates to an embossing device for embossing a single-ply or multi-ply web of tissue paper.

2. Technical Background

It is generally known that an embossing pattern on a web of tissue paper is applied using one or more steel rolls in combination with rubber rolls. The rubber rolls have a yielding surface which is elastically pressed by a raised embossing pattern on the steel roll. Tissue paper fed between the rubber roll and the steel roll is imparted with an embossing pattern into the sheet.

It is desired to combine a high degree of softness, which contributes to a good feeling for the user, with an appealing aesthetic appearance of the tissue paper. Therefore, a combination of different embossing patterns can be used. An embossing pattern with a regular arrangement of small protuberances in the embossed tissue paper contributes to a voluminous and soft feeling of the embossed paper, whereas the addition of an embossed aesthetic pattern serves to improve the aesthetic appearance.

There is a constant desire to obtain a good visual appearance of the graphic embossing pattern against a background pattern of rather densely distributed protuberances.

U.S. Pat. No. 4,320,162 describes a method for fabricating a multiple fibrous sheet structure in which each web is embossed with a first pattern embossment and a second pattern embossment, having different heights. The individual embossed webs are adhesively joined only in those portions of the embossments with greater height. The provision of greater height to the graphic embossments imparts a better visibility against the background pattern of smaller embossments. In addition, these so-called double-depth embossments are said to enhance the softness, the water retention and the bulk of a two-ply web.

EP 0 797 705 B1 describes an embossed paper sheet having first protuberances and second protuberances which are arranged according to a first and second pattern respectively. The first pattern is a graphic pattern sparingly distributed on the surface of the embossed paper sheet, whereas the second embossing pattern forms the background pattern distributed in a high concentration per surface area of the embossed paper sheet. The graphic embossing pattern is formed by protuberances which have a summit surface of linear form. This choice of distribution and form of the protuberances of the graphic embossing pattern and background pattern serves to improve the aesthetic appearance of the embossed paper sheet. The tissue paper plies are embossed in the nip between a metal edged roll and a rubber roll. The projecting elements on the metal roll forming the graphic and background pattern respectively can differ in height. The projecting elements forming the background pattern are lower than those projecting elements forming the graphic pattern.

All the above cited prior art documents relate to technical solutions which can serve to enhance the visibility of a graphic pattern applied to a tissue paper web in addition to that of a background pattern.

U.S. Pat. No. 5,269,983 relates to a rubber-to-steel mated embossing which uses a resilient roll in which recesses are formed. These laser cut recesses receive protrusions of a rigid male embossing roll when the rolls are placed in contact. Due to the indentations in the rubber roll, significantly less pressure is required between the rubber roll and the rigid roll for causing the rubber to press the web around the protrusions and against the land areas of the rigid roll. This reduces: the wear of the rubber

OBJECTS AND SUMMARY

It is an object of the invention to provide an embossing device which improves the visual appearance of a specific embossing pattern of embossed tissue paper.

It is an underlying principle of the invention to use a pair of rolls for the embossing, namely a steel roll with embossing protuberances on its peripheral surface and a second roll with a yielding layer on its peripheral surface cooperably disposed with respect to the steel roll as to form an embossing nip therewith. The steel roll and the second roll with the yielding layer run in synchronization.

In an embodiment of the present invention, the second roll has discrete zones on its peripheral surface with a different thickness of the yielding layer and/or different characteristics of the yielding layer compared to that of the remaining peripheral surface The yielding layer of the second roll can be, for example, thicker in those zones which in the embossing nip are opposing the protuberances forming the graphic pattern. This improves the visibility of the graphic pattern and intensifies the graphic appearance even though the height of the protuberances of the graphic pattern and the background pattern are the same. Therefore, the production of the steel embossing roll with an edged metal surface remains relatively simple because the height of the protrusions on the peripheral surface of the metal embossing cylinder are identical to those protuberances forming the background pattern and to those forming the decor pattern.

In a second embodiment of the present invention, the material characteristics of the yielding layer are changed in the discrete zones which, in the embossing nip, are opposed to the embossing protuberances of the steel rolls.

The material characteristics of the yielding layer are mainly responsible for the appearance of the embossing pattern so that the choice of different material characteristics of the yielding layer gives the possibility of influencing the deformation of the paper web in the embossing nip and the resulting aesthetic appearance. Wherein the first mentioned possibility of providing the yielding layer with a greater thickness in the discrete zones influences the outer shape of the second embossing roll, the provision of different material characteristics does not change the outer shape of the second roll. It should be noted that the provision of a bombage of the rolls, which is used to compensate a certain sagging of the rolls, is not to be interpreted as discrete zones with a greater thickness because those zones are not specifically opposed to certain embossing protuberances of the steel counter-roll.

The individual zones can have exactly the same shape as the embossing protuberances of the steel roll. It is, however, also possible to follow only the general shape of the embossing protuberances or to place the zones roughly opposed to the embossing protuberances of the counter roll. For complex geometries of the protuberances, an approximately opposed position of the individual zones might be the only feasible way to achieve the desired results without incurring high costs for the manufacturing of the second roll According to a preferred embodiment of the invention, the steel roll has first embossing protrusions forming a graphic pattern and second embossing protrusions forming a background pattern wherein the height of the first embossing protrusions and the height of the second embossing protrusions are identical. As outlined above, the provision of protrusions, all having the same height, makes it easier to produce the steel rolls and in turn reduces the overall costs for the embossing device.

In a preferred embodiment, the synchronization of the steel roll and the second roll, preferably a rubber coated roll, places the discrete zones of the rubber coated roll opposing to the first protuberances forming a graphic pattern. During the embossing of a paper web, a graphic pattern is produced which has a better visibility and visual appearance than the second background pattern. However, the inventive device can also be used to accentuate the background pattern over the graphic pattern by it becoming less pronounced and less visible. However, under normal circumstances, an improvement in the aesthetic appearance of the graphic pattern is desired.

According to a preferred embodiment of the invention, the second roller has an additional yielding layer in the discrete zones of its peripheral surface. In other words, there is a first yielding layer, e.g., a rubber layer, covering the whole peripheral surface of the second roll and, on top of it, a second yielding layer covering only the discrete zones.

According to a further preferred embodiment, the additional yielding layer has a different hardness compared to that of the yielding layer. For example, it is possible to provide an additional yielding layer with a lower rubber hardness than that of the yielding layer covering the remaining part of the peripheral surface of the second roll.

The provision of different material characteristics is not only possible in combination with a higher overall thickness of the second roll. It is also possible to produce a second roll which is covered by a yielding layer with discrete zones, the material characteristics of which are different. Alternatively, the second roll can be provided with a yielding layer of uniform thickness which undergoes a surface treatment which is either only applied to the discrete zones or applied to the remaining surface. Thus, the different material characteristics can either be generated by using a different material composition or by using a different surface treatment.

BRIEF DESCRIPTION OF THE DRAWINGS

In the following the invention is described by way of example only. With reference to the accompanying drawings, in which.

DETAILED DESCRIPTION OF THE PREFERRED EMBODIMENTS

Figure 1:
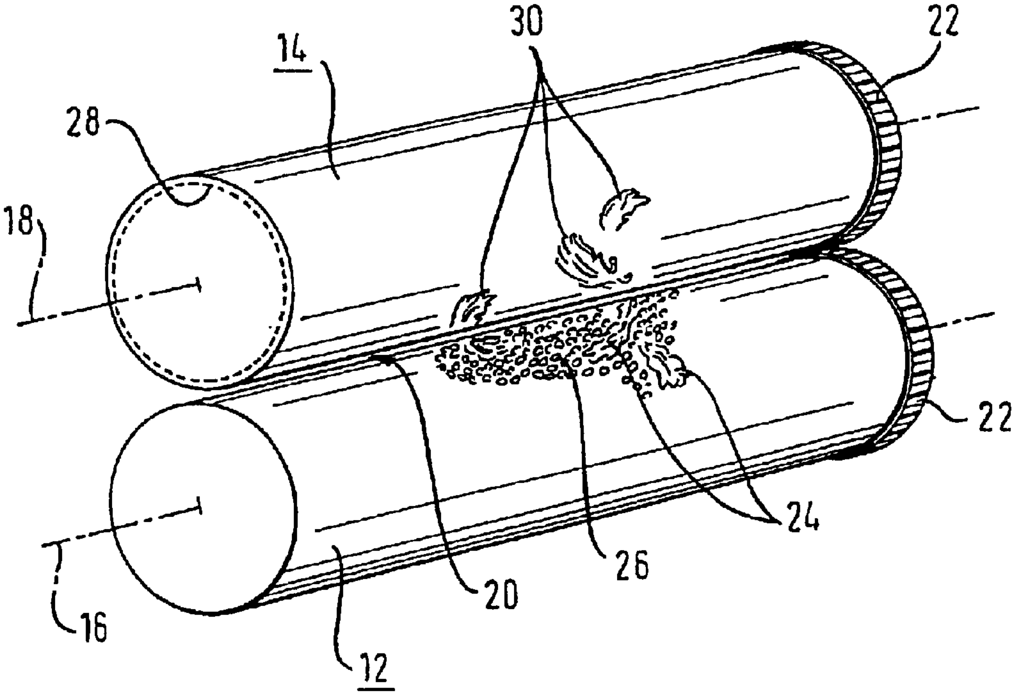
FIG. 1 shows first embodiment of the embossing device according to the invention.

In the following description of preferred embodiments of the invention, corresponding parts or elements in the different drawings will be denoted by the same reference numerals. In the schematic drawing according to FIG. 2, the height of the yielding surface layers was selected to clarify the invention and is not drawn to scale FIG. 1 shows part of an embossing station of an embodiment of the present invention comprising two cylindrical rolls, a steel embossing roll 12 and a rubber roll 14, both of which rotate around parallel rotational axes 16 and 18. The steel embossing roll 12 and rubber roll 14 are arranged so that an embossing nip 20 is formed between the rolls. Both rolls 12 and 14 are part of an embossing station, the periphery of which is not shown in FIG. 1. In order to ensure that the rubber roll 14 runs in exact registration with the steel embossing roll 12, both rolls, are provided with a geared portion around their circumference which mesh with each other so that, within the negligible play of meshing gears, the rubber roll 16 runs in synchronization with the steel embossing roll 12.

On the steel embossing roll 12, there are first and second protrusions which are only sketched on part of its peripheral surface. There are the first protrusions 24 which form a graphic pattern to be embossed on a single-ply or multi-ply web of tissue paper running through the nip 20. In the example according to FIG. 1, the first protrusions 24 have the shape of feathers, however, any decor can be used given that the first protrusions are for aesthetic purposes only. The first protrusions 24 cover a considerably larger surface area than the second protrusions 26 which serve to impart a background embossing to the tissue paper web to be embossed. The second protrusions 24 are of a much smaller surface area than the first protrusions 26 and have a simple geometrical shape like truncated cones, truncated pyramids or similar shapes. The first protrusions are preferably evenly distributed over the whole peripheral surface of the steel embossing roll 12 and are only left out in those parts of the steel embossing roll where the first protrusions 24 with the graphic decor are placed.

The rubber roll 14 is synchronised and in registration with the steel embossing roll 12 and has a flexible and yielding surface. The rubber roll 14 serves to squeeze the web running through the nip against the male protrusions of the steel embossing roll 12 and accommodate the protrusions of the steel embossing roll by virtue of its resilience. The yielding rubber layer on the rubber roll flows about the protrusions of the steel embossing roll as force is applied to bring the rolls together.

As indicated by the dotted line 28 in FIG. 1, the rubber roll 14 has a core of any suitable material which is covered by a surface layer of rubber.

According to the embodiment of the invention shown in FIG. 1, the rubber layer of the rubber roll has different Shore-A-values on its peripheral surface. In the embodiment depicted in FIG. 1, there are individual zones 30 on the peripheral surface of the rubber roll 14 which, as indicated by a comparison of their position with regard to the first protrusions 24 on the outer surface of the steel embossing roll, are arranged to be opposed to the first protrusions in the nip 20 between both rolls. Therefore, during the operation and synchronized rotation of the steel embossing roll 12 and rubber roll 14, the tissue paper web, which is to be embossed between both rolls, comes into contact with the individual zones 30 of the rubber roll where on the other side of tissue paper web there are the first protrusions 24. Therefore, the individual zones 30 and the first protrusions 24 cooperate in the embossing nip. In the example case shown in FIG. 1, the individual zones 30 have a rubber hardness of 55 Shore-A whereas the remaining surface area of the rubber roll has a yielding rubber coating with a hardness of 80 Shore-A. The softer surface zones 30 cooperate with the first protrusions 24 such that a more pronounced and sharper graphic embossing can be obtained.

Preferably, the height of the first protrusions 24 and the second protrusions 26 is identical or similar. In practical terms, individual zones in the rubber roll 14 which have a higher degree of hardness are favoured with regard to the visibility of a graphic pattern. However, there might be tissue paper which is sensitive to mechanical load. In this instance, it is quite possible that individual zones with a lower degree of rubber hardness be preferred in order to improve the visual appearance of a graphic pattern.

In general, the rubber hardness of the surface layer of the rubber roll 14 can vary between 25 to 100 Shore-A. However, the preferred range is between 45 and 80 Shore-A.

According to another embodiment of the invention, the rubber roll 14 might be provided with elevated surface areas corresponding to the individual zones 30 shown in FIG. 1. These elevated surface areas have a similar effect to the provision of individual zones 30 in FIG. 1 with a higher degree of rubber hardness. In these elevated zones, there is a higher pressure between the steel embossing roll 12 and the rubber roll 14 so that the first protrusions are pressed into the tissue paper web resulting in a good visibility of the graphic pattern.

Figure 2:
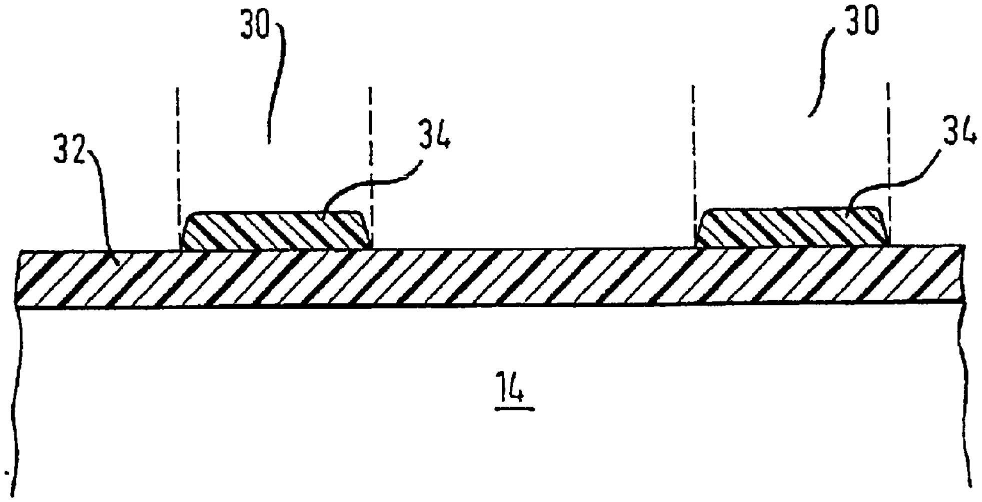
FIG. 2 shows a sectional detail view of the surface layer of a rubber embossing roll.

FIG. 2 discloses a sectional view of a part of the rubber roll 14 with a first rubber layer 32 and a second rubber layer 34 in the individual zones 30 which come into contact with the first protrusions on the synchronised steel embossing roll. The second rubber layer 34 can have the same or a different rubber hardness depending on the specific requirements, the tissue material to be embossed and the shape and density of the protrusions.

In general, the use of a different material in the individual zones 30 and, alternatively or in combination, the possible provision of elevated areas in these zones opens up the possibility of adjusting the optimum visibility of different embossing patterns having the same height on the corresponding steel embossing roll.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An embossing device for embossing a single-ply or multi-ply web of tissue paper, comprising:

a first roll with embossing protrusions on its peripheral surface; and a second roll with a yielding layer on its peripheral surface cooperably disposed with respect to the first roll as to form an embossing nip therewith;

the first roll and the second roll run in synchronization;

the second roll has individual zones on its peripheral surface with a higher overall thickness and/or different material characteristics of the yielding layer compared to that of the remaining peripheral surface;

wherein the individual zones are generally opposed in the embossing nip to the embossing protrusions of the first roll.

2. The embossing device according to claim 1, wherein the first roll has first embossing protrusions forming a graphic pattern and second embossing protrusions forming a background pattern, the height of the first embossing protrusions and the second embossing protrusions being substantially identical.

3. The embossing device according to claim 1, wherein the second roll is a rubber coated roll.

4. The embossing device according to claim 2, wherein the synchronization of the first roll and the second roll places the individual zones of the second roll opposing the first protrusions.

5. The embossing device according to claim 1, wherein the second roll has an additional yielding layer in the individual zones of its peripheral surface.

6. The embossing device according to claim 5, wherein the additional yielding layer has a different hardness compared to the yielding layer in the remaining part of the peripheral surface.

7. The embossing device according to claim 1, wherein the yielding layer of the individual zones has a different material composition and/or surface treatment compared to the yielding layer of the remaining part of the peripheral surface.

8. The embossing device of claim 1, wherein first roll is metal.

9. The embossing device of claim 1, wherein first roll is steel.

10. The embossing device according to claim 2, wherein the second roll is a rubber coated roll.

11. The embossing device according to claim 2, wherein the second roll has an additional yielding layer in the individual zones of its peripheral surface.

12. The embossing device according to claim 3, wherein the second roll has an additional yielding layer in the individual zones of its peripheral surface.

13. The embossing device according to claim 2, wherein the yielding layer of the individual zones has a different material composition and/or surface treatment compared to the yielding layer of the remaining part of the peripheral surface.

* * * * *